(12) United States Patent
Matsuo et al.

(10) Patent No.: US 6,310,030 B1
(45) Date of Patent: Oct. 30, 2001

(54) UNSATURATED CARBOXYLIC ACID POLYMER, BIODEGRADABLE BUILDER, AND DETERGENT COMPOSITION

(75) Inventors: Shigeru Matsuo; Yoshikatsu Seino, both of Tokuyama (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/622,917
(22) PCT Filed: Mar. 19, 1999
(86) PCT No.: PCT/JP99/01389
  § 371 Date: Sep. 7, 2000
  § 102(e) Date: Sep. 7, 2000
(87) PCT Pub. No.: WO99/48938
  PCT Pub. Date: Sep. 30, 1999

(30) Foreign Application Priority Data

Mar. 20, 1998 (JP) .................................................. 10-072697
Sep. 21, 1998 (JP) .................................................. 10-266011
Nov. 5, 1998 (JP) .................................................. 10-314597
Dec. 7, 1998 (JP) .................................................. 10-347379

(51) Int. Cl.[7] .............................. C11D 3/37; C08F 22/02
(52) U.S. Cl. ............................................. 510/476; 528/205
(58) Field of Search .................................. 528/192, 205, 528/219; 510/476

(56) References Cited

FOREIGN PATENT DOCUMENTS

891922 A1 * 1/1999 (EP) .
WO 97/38029 * 10/1997 (WO) .

OTHER PUBLICATIONS

M. Ueda et al., Polymer Letters vol. 9, 367–369 (May 1971).*
S. Iwabuchi et al, Journal of Polymer Science, Polymer Chemistry Ed., vol. 15, 405–415 (Feb. 1977).*

* cited by examiner

*Primary Examiner*—John Hardee
(74) *Attorney, Agent, or Firm*—Oblon, Spivak, McClelland, Maier & Neustadt, P.C.

(57) ABSTRACT

Provided are an unsaturated carboxylic acid polymer having a degree of calcium-sequestering ability of at least 150 mg $CaCO_3$/g, a degree of 28-day biodegradability of at least 40%, and a number-average molecular weight of from 500 to 1,000,000; a process for producing the unsaturated carboxylic acid polymer by copolymerizing an unsaturated carboxylic acid or its salt with a quinone in the presence of a polymerization initiator; a builder comprising the polymer; a detergent composition comprising the builder and a surfactant; and a dispersant comprising the polymer. The polymer has good calcium ion-sequestering ability and good biodegradability, and is highly useful as a material for builders.

22 Claims, No Drawings

UNSATURATED CARBOXYLIC ACID POLYMER, BIODEGRADABLE BUILDER, AND DETERGENT COMPOSITION

TECHNICAL FIELD

The present invention relates to a novel unsaturated carboxylic acid polymer, and to its production and use. More precisely, the invention relates to an unsaturated carboxylic acid polymer having good properties of high detergency and biodegradability, to a method for efficiently producing it, and to a biodegradable builder, a detergent composition and a dispersant containing the polymer as the constituent ingredient.

BACKGROUND ART

Conventional detergent comprising surfactant as an essential ingredient contains a builder as an auxiliary component to the surfactant to thereby improve its detergency. As the builder, known are inorganic compounds which are alkaline in water, and polymers of unsaturated aliphatic carboxylic acids. As examples of the former, mentioned are sodium and potassium carbonates, hydrogencarbonates, phosphates, polyphosphates and silicates, as well as zeolite, etc.; while examples of the latter include polyacrylic acid, polymaleic acid, polyitaconic acid, etc.

Of those builders, much used are phosphates, polyphosphates and zeolite, as they are effective, economical and easy to handle. However, these are problematic from the viewpoint of the protection of the global environment in that phosphates and polyphosphates eutrophicate lakes, marshes and rivers while zeolite precipitates in rivers, etc.

Accordingly, it is desired to develop some other builders, of which the capability, especially, the chelating ability (calcium ion-sequestering ability) is good like that of conventional builders, which are well biodegradable to be gentle to the environment, without remaining for a long period of time on the earth, and are therefore not problematic from the important viewpoint of the protection of the global environment, and which are economical.

Given that situation, Japanese Patent Laid-Open No. 239127/1993 discloses chelatable and biodegradable, crosslinked polymers suitable for builders. To prepare the polymers, water-soluble oligomers, which have little chelatability by themselves but contain biodegradable low-molecular components, are crosslinked at their main chains with a crosslinking agent, such as polyethylene glycol, citric acid, tartaric acid or the like, via a biodegradable ester or amido group to thereby increase their molecular weight, and the resulting crosslinked polymers are modified to have chelatability. However, though having a low molecular weight thereby to have increased biodegradability, the linear polyacrylic acid moiety in those crosslinked polymers is hardly biodegradable, and, in addition, the polymers contain hardly-biodegradable high-molecular-weight linear polyacrylic acids to no small extent. Therefore, the biodegradability of the crosslinked polymers disclosed is not satisfactory. Another problem with the polymers is that the method for producing them is not simple, as requiring two steps, one for polymerizing the oligomer and the other for crosslinking the polymerized oligomer, and requiring the special crosslinking agent.

Japanese Patent Laid-Open No. 80377/1975 discloses acrylic acid or acrolein polymers and their modified derivatives or copolymers usable as builders. However, these are all problematic in that their chelatability and biodegradability are not satisfactory.

Accordingly, it is desired to develop polymers having good chelatability and good biodegradability and therefore suitable to builders and to develop methods for efficiently producing them.

In the field of dispersants for inorganic pigments, sodium polyacrylate or the like is used for lowering the viscosity of slurry dispersions and for improving the viscosity stability thereof. However, polyacrylic acid is not biodegradable. Also in this field, therefore, it is desired to develop some other dispersants which are biodegradable without remaining on the earth for a long period of time and which are economical.

The present invention is to provide an unsaturated carboxylic acid polymer having good chelatability and good biodegradability and therefore suitable to builders, to provide a method for efficiently producing it, and to provide a builder for detergent, a detergent composition and a dispersant containing the polymer as the constituent ingredient.

DISCLOSURE OF THE INVENTION

In order to attain the object, we, the present inventors have assiduously studied, and, as a result, have found that an unsaturated carboxylic acid polymer having a specific chemical structure in the molecular chain has good chelatability and good biodegradability and is economical as being able to be efficiently produced in a simple process, and that the polymer is useful as a builder for detergent compositions and also as a dispersant. On the basis of these findings, we have completed the present invention.

Specifically, the summaries of the invention are as follows:

1. An unsaturated carboxylic acid polymer having a degree of calcium ion-sequestering ability of at least 150 mg $CaCO_3$/g, a degree of 28-day biodegradability of at least 40%, and a number-average molecular weight of from 500 to 1,000,000.

2. An unsaturated carboxylic acid polymer having a number-average molecular weight of from 500 to 1,000,000, which is prepared by copolymerizing an unsaturated carboxylic acid or its salt of a general formula [I]:

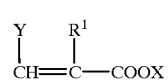

[I]

wherein X represents a hydrogen atom, an alkali metal atom, or an ammonium group; Y represents a hydrogen atom or a group COOX; $R^1$ represents a hydrogen atom or a methyl group, with a quinone in the presence of a polymerization initiator.

3. An unsaturated carboxylic acid polymer having repetitive units (1) of a general formula [II]:

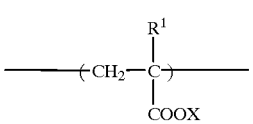

[II]

wherein X represents a hydrogen atom, an alkali metal atom, or an ammonium group; $R^1$ represents a hydrogen atom or a methyl group, repetitive units (2) of a general formula [III]:

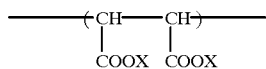

[III]

wherein X represents a hydrogen atom, an alkali metal atom, or an ammonium group,
and repetitive units (3) of a general formula [IV]:

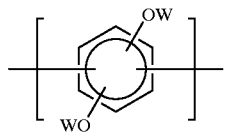

[IV]

wherein W represents a hydrogen atom, an alkali metal atom, or an ammonium group,
and having a number-average molecular weight of from 500 to 1,000,000.

4. The unsaturated carboxylic acid polymer of above 3, which comprises from 30 to 99.5 mol % of the repetitive units (1), from 0 to 60 mol % of the repetitive units (2), and from 0.5 to 20 mol % of the repetitive units (3).

5. A method for producing an unsaturated carboxylic acid polymer, which comprises copolymerizing an unsaturated carboxylic acid or its salt of formula [I] with a quinone in the presence of a polymerization initiator.

6. The method for producing an unsaturated carboxylic acid polymer of above 5, in which the quinone is hydroquinone or benzoquinone.

7. The method for producing an unsaturated carboxylic acid polymer of above 5 or 6, in which the polymerization initiator is a combination of (a) hydrogen peroxide and (b) at least one reducing agent selected from iron ions, copper ions, zinc ions, nickel ions, ascorbic acid and saccharin.

8. The method for producing an unsaturated carboxylic acid polymer of above 5 or 6, in which the polymerization initiator is an azo-type polymerization initiator.

9. The method for producing an unsaturated carboxylic acid polymer of any of above 5 to 8, in which a compound of a general formula [V]:

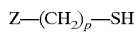

Z—$(CH_2)_p$—SH   [V]

wherein Z represents a hydroxyl group or an amino group;
p indicates an integer of from 1 to 6,
is further used as a chain transfer agent in a ratio of from 0.1 to 20 mol % of all the starting monomers.

10. A biodegradable builder containing, as the constituent ingredient, the unsaturated carboxylic acid polymer of any of above 1 to 4.

11. A detergent composition containing, as the constituent ingredients, the unsaturated carboxylic acid polymer of any of above 1 to 4 and a surfactant.

12. A dispersant comprising a polymer prepared by neutralizing the unsaturated carboxylic acid polymer of any of above 1 to 4 with an alkali.

13. A detergent composition containing an unsaturated carboxylic acid copolymer and a surfactant, in which the copolymer has repetitive units (1) of a general formula [VI]

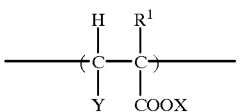

[VI]

wherein X represents a hydrogen atom, an alkali metal atom, or an ammonium group; Y represents a hydrogen atom or a group COOX; $R^1$ represents a hydrogen atom or a methyl group,
and repetitive units (2) of a general formula [IV]:

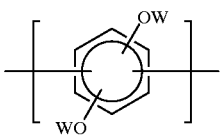

[IV]

wherein W represents a hydrogen atom, an alkali metal atom, or an ammonium group,
and has a number-average molecular weight of from 500 to 1,000,000.

14. The detergent composition of above 13, in which the repetitive units (2) account for from 0.5 to 20 mol % of the unsaturated carboxylic acid copolymer.

15. The detergent composition of above 13 or 14, in which the surfactant is one or more selected from alkylbenzenesulfonate, α-olefinsulfonate, alkyl sulfates, alkyl-polyoxyethylene sulfates, alkyl-polyoxyethylene ether sulfates, and higher alcohol sulfates.

16. The detergent composition of any of above 13 to 15, in which the ratio of the unsaturated carboxylic acid copolymer to the surfactant falls between ¼ and ⅟₃₀ by weight.

17. The detergent composition of any of above 13 to 16, which further contains an enzyme, a fluorescent brightening agent and an anti-foaming agent.

BEST MODES OF CARRYING OUT THE INVENTION

The unsaturated carboxylic acid polymer of the invention has a degree of calcium ion-sequestering ability of at least 150 mg $CaCO_3$/g, a degree of 28-day biodegradability of at least 40%, preferably at least 60%, and a number-average molecular weight of from 500 to 1,000,000. Various types of unsaturated carboxylic acid polymers having good calcium ion-sequestering ability have heretofore been developed, but none of such known unsaturated carboxylic acid polymers satisfy both the degree of calcium ion-sequestering ability and the degree of 28-day biodegradability like those of the unsaturated carboxylic acid polymer of the invention as above.

Specifically, the unsaturated carboxylic acid polymer of the invention has a number-average molecular weight of from 500 to 1,000,000, and is prepared by copolymerizing an unsaturated carboxylic acid or its salt of above formula [I] with a quinone in the presence of a polymerization initiator.

Preferably, the unsaturated carboxylic acid polymer has the repetitive units (1) of above formula [II], the repetitive units (2) of above formula [III] and the repetitive units (3) of above formula [IV]. Also preferably, it is a ternary copolymer comprising from 30 to 99.5 mol % of the repetitive units (1), from 0 to 60 mol % of the repetitive units (2), and from 0.5 to 20 mol %, more preferably from 0.5 to 15 mol % of the repetitive units (3).

Regarding the compositional ratio of the structural units constituting the unsaturated carboxylic acid polymer, if the proportion of the repetitive units (1) is smaller than 30 mol %, the biodegradability of the polymer will be low; but if larger than 99.5 mol %, the biodegradability and the calcium ion-sequestering ability of the polymer will be low. If the proportion of the repetitive units (2) is larger than 60 mol %, the amount of the non-reacted monomer found in the polymer will increase. If the proportion of the repetitive units (3) is smaller than 0.5 mol %, the biodegradability of the copolymer could not increase to a satisfactory degree; but if larger than 20 mol %, the calcium ion-sequestering ability thereof will be low. For these reasons, it is desirable that the polymer composition falls within the defined range as above.

The polymer has a number-average molecular weight falling between 500 and 1,000,000, preferably between 1,000 and 100,000, more preferably between 1,000 and 50,000. If its number-average molecular weight is smaller than 500, the polymer could not enjoy good chelatability when used as a builder; but if larger than 1,000,000, the biodegradability of the polymer will be low.

Regarding its chemical structure, the unsaturated carboxylic acid polymer of the invention has the repetitive units mentioned above, but may additionally have any other structural units derived from other unsaturated compounds different from those for the repetitive units of the above formulae, within the range not interfering with the object of the invention, for example, in an amount of from 1 to 30 mol %. The unsaturated compounds include, for example, fumaric acid, acrolein, vinyl acetate, alkyl acrylates, half esters of maleic acid, etc.

For its production, the unsaturated carboxylic acid polymer of the invention may be produced by copolymerizing an unsaturated carboxylic acid or its salt of above formula [I] with a quinone in the presence of a polymerization initiator.

For the unsaturated carboxylic acid of formula [I], concretely, preferred are acrylic acid, methacrylic acid, maleic acid, fumaric acid, etc. One or more of these may be used either singly or as combined. In case of combining two or more such unsaturated carboxylic acids, for example, from 30 to 99.5 mol % of acrylic acid may be combined with from 0 to 60 mol % of maleic acid. The unsaturated carboxylic acids may be in the form of their anhydrides. Their salts are also employable, including alkali metal salts and ammonium salts.

The quinone includes p-hydroxyphenol, o-hydroxyphenol, m-hydroxyphenol, 2-methoxyhydroquinone, tetramethylhydroquinone, p-benzoquinone, o-benzoquinone, toluquinone, naphthoquinone, anthraquinone, methoquinone, etc. Of those, especially preferred are p-hydroxyphenol and p-benzoquinone.

The polymerization initiator to be used in the reaction of the unsaturated carboxylic acid or its salt with a quinone includes, for example, a combination of hydrogen peroxide and a reducing agent, as well as percarboxylic acids, permaleic acids, etc. For the reducing agent, preferred are iron ions, copper ions, zinc ions, nickel ions, ascorbic acid, saccharin, etc. The ratio of the polymerization initiator to be used may fall between 0.1 and 30% by weight, but preferably between 0.5 and 20% by weight of all the starting monomers.

As the polymerization initiator, also employable are azobisisobutyronitrile, azobis-2,4-dimethylvaleronitrile, azobiscyclohexanecarbonitrile, tetramethylthiuramdisulfide, etc. The ratio of the azo-type polymerization initiator to be used may fall between 0.1 and 10% by weight, but preferably between 0.5 and 5% by weight of all the starting monomers. If the ratio of the polymerization initiator used is smaller than the defined range, the polymers produced could not have a sufficiently high molecular weight; but even if over the defined range, it would not produce anymore favorable results.

If desired, a chain transfer agent may be used in the reaction of the unsaturated carboxylic acid or its salt with a benzoquinone. For the chain transfer agent, preferred are compounds of above formula [V]. Compounds of formula [V] include, for example, mercaptoethyl alcohol, mercaptopropyl alcohol, mercaptobutyl alcohol, aminoethanethiol, etc. Of those, especially preferred is mercaptoethyl alcohol. The ratio of the chain transfer agent to be used may fall generally between 1 and 20%, but preferably between 3 and 15% by weight of all the starting monomers. If it is smaller than 1% by weight, the chain transfer agent used will be ineffective; but if larger than 20% by weight, the chelatability of the polymers produced will be poor.

In producing the unsaturated carboxylic acid polymer, in general, no solvent is used, or an aqueous solvent is used. As the case may be, a non-aqueous solvent may be used. The non-aqueous solvent includes acetone, dimethylformamide, dimethylacetamide, ethyl acetate, N-methylpyrrolidone, benzene, toluene, xylene, dioxane, etc. To produce the polymer, the monomers are polymerized preferably in an aqueous solvent, but may be in a non-aqueous solvent. For the non-aqueous solvent, preferred is acetone.

Regarding the reaction condition for the polymerization, the pressure may fall between atmospheric pressure and 50 kg/cm$^2$.G, but preferably between atmospheric pressure and 5 kg/cm$^2$.G; and the temperature may fall between 30 and 150° C., but preferably between 50 and 120° C. The polymerization time may vary, depending on the type of the starting compounds to be reacted and on the polymerization temperature, but falls generally between 5 minutes and 20 hours, preferably between 1 and 4 hours. Concretely, starting compounds are first put into a reactor, and a polymerization initiator is added thereto over a period of time falling between 5 minutes and 4 hours, preferably between 10 minutes and 3 hours. While the polymerization initiator is thus added thereto, the starting compounds are polymerized. Alternatively, a polymerization initiator and a comonomer are fed into the reactor over a period of time falling between 5 minutes and 4 hours, preferably between 10 minutes and 3 hours, and the monomers in the reactor are thus polymerized within that period of time. As the case may be, a polymerization initiator, a comonomer and an aqueous solution of sodium hydroxide, of which the amount is the same by mol as the comonomer or may be any desired one, are fed into the reactor over a period of time falling between 5 minutes and 4 hours, preferably between 10 minutes and 3 hours, and the monomers in the reactor are thus polymerized within that period of time.

The biodegradable builder of the invention comprises the unsaturated carboxylic acid polymer thus produced in the manner mentioned above, and has good chelatability and biodegradability. Therefore, it is favorable to detergent.

When combined with a surfactant, the unsaturated carboxylic acid polymer forms a biodegradable detergent composition. The surfactant includes, for example, anionic surfactants, cationic surfactants, nonionic surfactants and ampholytic surfactants.

Regarding the blend ratio of the builder to the surfactant in the detergent composition, it is desirable that the former accounts for from 5 to 50% by weight of the detergent composition while the latter for from 10 to 50% by weight thereof with the remainder being any of enzyme, bleaching agent, inorganic builder (e.g., zeolite, sodium carbonate) and others.

In the other detergent compositions of above 12 to 17 of the invention, the unsaturated carboxylic acid copolymer serving as a builder has the repetitive units (1) of above formula [VI] and there petitive units (2) of above formula [IV], and has a number-average molecular weight of from 500 to 1,000,000. Preferably, the repetitive units (2) of formula [IV] account for from 0.5 to 20 mol % of the unsaturated carboxylic acid copolymer. In the copolymer, it is desirable that the repetitive units (2) bond at random to the repetitive units (1). If the content of the repetitive units (2) in the copolymer is smaller than 0.5 mol %, the compatibility of the copolymer with surfactant will be poor; but if larger than 20 mol %, the chelatability, that is, the calcium ion-sequestering ability of the copolymer will be poor. For these reasons, the content of the repetitive units (2) in the copolymer preferably falls within the defined range.

The unsaturated carboxylic acid copolymer preferably has the repetitive units (1) of above formula [VI] and the repetitive units (2) of above formula [IV], but may optionally have any other repetitive units derived from other unsaturated compounds within the range not interfering with the object of the invention, for example, within a range falling between 1 and 30 mol %. The unsaturated compounds include, for example, itaconic acid, crotonic acid, α-hydroxyacrylic acid, vinylsulfonic acid, allylsulfonic acid, vinyltoluenesulfonic acid and their alkali metal salts and ammonium salts, as well as esters of alcohols having from 1 to 12 carbon atoms, vinyl acetate, acrolein, etc.

The unsaturated carboxylic acid copolymer has a number-average molecular weight falling between 500 and 1,000,000, preferably between 1,000 and 100,000, more preferably between 1,000 and 50,000. If its number-average molecular weight is smaller than 500, the copolymer could not have good chelatability enough to act as a builder; but if larger than 1,000,000, the compatibility of the copolymer with surfactant will be poor.

Regarding its production, the unsaturated carboxylic acid copolymer may be efficiently produced by copolymerizing an unsaturated carboxylic acid or its salt of above formula [I] with a hydroquinone or benzoquinone in the presence of a polymerization initiator.

In preparing the detergent composition of the invention, the blend ratio of the essential component, builder of the unsaturated carboxylic acid copolymer to the surfactant may fall between ¼ and ⅟30, preferably between ⅛ and ⅟20 by weight. To have better detergency, the composition preferably contains an enzyme, a fluorescent brightening agent and an anti-foaming agent that are generally used in detergent.

In the detergent composition of the invention thus produced in the manner mentioned above, it is desirable that the content of the builder component comprising the unsaturated carboxylic acid copolymer falls between 0.1 and 20% by weight, more preferably between 2 and 5% by weight of the composition. If the builder content thereof is smaller than 0.1% by weight, the composition could not enjoy good detergency; but even if larger than 20% by weight, it would not produce any more favorable results. For these reasons, the builder content of the composition preferably falls within the defined range. Regarding the amount of the optional components, enzyme, fluorescent brightening agent and anti-foaming agent that may be in the composition, it is desirable that they are each in an amount of from 0.1 to 5.0% by weight of the composition.

Preferred anionic surfactants for use herein include, for example, soap of fatty acids, salts of alkyl ether-carboxylic acids, salts of N-acylamino acids, salts of alkylbenzenesulfonic acids, salts of alkylnaphthalenesulfonic acids, salts of dialkylsulfosuccinates, salts of α-olefinsulfonic acids, salts of sulfates with higher alcohols, salts of alkyl ether-sulfuric acids, salts of polyoxyethylene-alkyl phenyl ether-sulfuric acids, salts of sulfates with fatty acid alkylolamides, salts of alkyl ether-phosphates, salts of alkylphosphates, etc.

Preferred cationic surfactants include aliphatic amine salts, aliphatic quaternary ammonium salts, benzalkonium salts, benzetonium chloride, pyridinium salts, imidazolinium salts, etc.

Preferred nonionic surfactants include polyoxyethylene alkyl ethers, polyoxyethylene alkylphenyl ethers, polyoxyethylene-polyoxypropylene block polymers, polyoxyethylene-polyoxypropylene alkyl ethers, polyoxyethylene-glycerin fatty acid esters, polyoxyethylene-castor oil, polyoxyethylene-sorbitan fatty acid esters, polyoxyethylene-sorbitol fatty acid esters, polyethylene-glycol fatty acid esters, fatty acid monoglycerides, polyglycerin fatty acid esters, sorbitan fatty acid esters, fatty acid alkanolamides, polyoxyethylene-fatty acid amides, polyoxyethylene-alkylamines, alkylamine oxides, etc.

Preferred ampholytic surfactants include, for example, carboxybetaine-type compounds, salts of aminocarboxylic acids, imidazolinium betaine, etc.

When neutralized with an alkali, for example, in an aqueous solution of sodium hydroxide or potassium hydroxide in an ordinary manner, the unsaturated carboxylic acid polymer of the invention may be converted into a hydrophilic polymer of which the main chain comprises unsaturated carboxylic acid monomer units and which has a number-average molecular weight of from 1,000 to 100,000. Owing to its chemical structure, the resulting polymer has good biodegradability and is therefore useful as a dispersant for inorganic pigments such as calcium carbonate, clay and others that may be in coating agents for paper, etc. The dispersant has the advantage of low environmental influence.

To prepare the coating agent of that type, from 0.05 to 2.0 parts by weight of the dispersant may be added to 100 parts by weight of an inorganic pigment such as calcium carbonate, clay or the like, and the resulting mixture may be dispersed in water. Comprising the dispersant, the coating agent may have reduced viscosity and increased fluidity. In this, the dispersant may be alone or may be combined with any other ingredients such as polyvinyl alcohol, etc.

As being highly chelatable, the unsaturated carboxylic acid polymer of the invention is further usable as a scale inhibitor in various devises of coolant systems, water pipe lines in boilers, etc.

EXAMPLES

The invention is described in more detail with reference to the following Examples, in which the number-average molecular weight, the $^1$H-NMR data, the calcium ion-sequestering ability and the biodegradability of the polymers produced, as well as the detergency and the dispersibility of the polymer-containing samples produced were measured and evaluated according to the methods mentioned below.

(1) Number-average Molecular Weight:

The molecular weight of each sample was measured through gel permeation chromatography (GPC), using polyacrylic acid as the standard substance.

For this, usedwasa Nippon Bunko's system, GPC-900 Model [detector: built-in differential diffractometer, column: Shodex Asahipak (GF-7M HQ and GF-310 HQ)]. The mobile phase was 1 mM $NaH_2PO_4$/7 mM $Na_2HPO_4$ (3/7) in acetonitrile; the column temperature was 40° C.; the flow rate was 0.7 ml/min; and the amount of the sample charged was 200 $\mu$l.

(2) $^1$H-NMR

For this, used was a JEOL system, GX-270 Model. A solution of apolymer sample in a solvent of heavy water, having a polymer concentration of smaller than 5% by weight, was put into a test tube having a diameter of 5 mm, and subjected to $^1$H-NMR at room temperature in an NON mode at 270 MHz, and the data were integrated 50 times.

(3) Calcium Ion-Sequestering Ability

Just 20 mg of a polymer sample was put into a 200 ml beaker, to which was added 100 g of an aqueous solution containing 0.1 N calcium chloride, 0.1 N potassium chloride and 0.4 N ammonia and having a Ca ion concentration of 40 ppm, and the polymer sample was dissolved in the aqueous solution. The divalent Ca ion concentration in the resulting solution was measured, using a Ca ion electrode. The amount of calcium ions as sequestered by 1 g of the polymer was obtained in terms of $CaCO_3$, which indicates the $Ca^{2+}$-sequestering ability (mg.$CaCO_3$/g) of the polymer.

(4) Biodegradability

According to JIS K6950, each polymer sample was tested for 28-day biodegradation with activated sludge. From TOC (total organic carbon) of the sample thus tested, obtained was the degree of biodegradability of the polymer.

(5) Detergency

An artificial soiling composition comprised of the following components was prepared:

| | |
|---|---|
| Organic Soiling Matter | 69.7 wt.pts. |
| Burnt Clay | 29.8 wt.pts. |
| Carbon Black | 0.5 wt.pts. |

The organic soiling matter was comprised of the following substances in the ratio as below:

| | |
|---|---|
| Oleic Acid | 28.3 wt.pts. |
| Triolein | 15.6 wt.pts. |
| Cholesterol-olein | 12.2 wt.pts. |
| Liquid Paraffin | 2.5 wt.pts. |
| Squalene | 2.5 wt.pts. |
| Cholesterol | 1.6 wt.pts. |
| Gelatin | 7.0 wt.pts. |
| Total | 69.7 wt.pts. |

Clean fabric was soiled with this artificial soiling composition in an wet system using an aqueous solvent, and the thus-soiled fabric was cut into pieces of 5 cm×5 cm each. These pieces had a degree of reflectivity of from 38 to 43%. The surface reflectivity of each soiled piece was measured. Those soiled pieces were subjected to a washing test under the condition mentioned below.

| | |
|---|---|
| Washing Tester: | Terg-O-Tometer |
| Number of Revolutions: | 120 rpm |
| Hardness of Water: | 90 ppm (in terms of $CaCO_3$) |
| Amount of Washing Liquid: | 900 ml |
| Washing Temperature: | 30° C. |
| Concentration of Detergent: | 0.067% |
| Bath Ratio: | 30 times |
| Washing Time: | 10 minutes |
| Rinsing Time: | Two times for 3 minutes each |

Drying: Sandwiched between sheets of dry filter paper and dried by ironing.

Next, the surface reflectivity of the washed test piece was measured, and the detergency of the detergent tested was obtained according to the following equation.

$$\text{Detergency (\%)} = \{[(K/S \text{ of soiled fabric}) - (K/S \text{ of washed fabric})] / [(K/S \text{ of soiled fabric}) - (K/S \text{ of clean fabric})]\} \times 100$$

wherein;

$K/S = (1-R)^2/2R$ (Kubelka-Munk's equation) in which R indicates the surface reflectivity of fabric.

(6) Dispersibility (absorbance)

100 ml of an aqueous dispersion containing 10 ppm by weight of a polymer sample and 1% by weight of activated clay was stirred for 10 minutes, and put into a 100 ml mess-cylinder. This was kept static for 14 hours. Next, 5 ml of the supernatant was sampled out, and its absorbance at 400 nm was measured. This indicates the dispersibility of the dispersion tested.

EXAMPLE 1

19.6 g of maleic anhydride, 8.0 g of sodium hydroxide and 30 g of water were put into a 500 ml separable flask equipped with a stirrer and a thermocouple, and heated at 110° C. To this were dropwise added a solution of 78.4 g of maleic anhydride, 56.6 g of aqueous 60% hydrogen peroxide, 72.0 g of acrylic acid and 6.2 g of p-methoxyphenol, and a solution of 72 g of sodium hydroxide and 78 g of water, at the same time over a period of 30 minutes, with stirring them. After the addition, this was further stirred under heat at the same temperature for 1 hour. After having been thus reacted, this was lyophilized into a solid. The properties, the amount and the yield of the polymer thus obtained are given in Table 1.

EXAMPLE 2

19.6 g of maleic anhydride, 8.0 g of sodium hydroxide and 30 g of water were put into a 500 ml separable flask equipped with a stirrer and a thermocouple, and heated at 110° C. To this were dropwise added a solution of 78.4 g of maleic anhydride, 56.6 g of aqueous 60% hydrogen peroxide, 72.0 g of acrylic acid and 6.2 g of p-methoxyphenol, and a solution of 72 g of sodium hydroxide, 19.5 g of mercaptophenol and 58.5 g of water, at the same time over a period of 30 minutes, with stirring them. After the addition, this was further stirred under heat at the same temperature for 1 hour. After having been thus reacted, this was lyophilized into a solid. The properties, the amount and the yield of the polymer thus obtained are given in Table 1.

EXAMPLE 3

The same process as in Example 1 was repeated, except that 5.5 g of resorcinol was used in place of 6.2 g of p-methoxyphenol. The properties, the amount and the yield of the polymer thus obtained are given in Table 1.

EXAMPLE 4

The same process as in Example 1 was repeated, except that 9.3 g of p-phenoxyphenol was used in place of 6.2 g of p-methoxyphenol. The properties, the amount and the yield of the polymer thus obtained are given in Table 1.

Comparative Example 1

1.96 g of maleic anhydride, 0.8 g of sodium hydroxide and 2 g of water were put into a 100 ml separable flask equipped with a stirrer and a thermocouple, and heated at 100° C. To this were dropwise added a solution of 13.72 g of maleic anhydride, 6.35 g of aqueous 60% hydrogen peroxide and 11.52 g of acrylic acid, and a solution of 12 g of sodium hydroxide and 12 g of water, at the same time over a period of 30 minutes, with stirring them. After the addition, this was further stirred under heat at the same temperature for 2 hours. After having been thus reacted, this was lyophilized into a solid. The properties, the amount and the yield of the polymer thus obtained are given in Table 1.

EXAMPLES 5 AND 6

The polymer obtained in Example 2 or 3 was formed into an aqueous solution having pH of 10 with sodium hydroxide added thereto. This was lyophilized into a solid polymer. The polymer serves as a builder. A detergent composition comprising the polymer as a builder was prepared, and tested for the detergency. The data obtained are given in Table 2.

Regarding the abbreviations of the ingredients of the detergent composition in the Table, LAS indicates linear sodium alkylbenzenesulfonate; AS indicates sodium alkylsulfate; and PEG indicates polyethylene glycol. The same shall apply to the other Tables.

Comparative Examples 2 and 3

Detergent compositions were prepared in the same manner as in Examples 5 and 6, except that zeolite type A was used as the builder in place of the polymer. The data obtained are given in Table 2.

EXAMPLE 7

3 g of water was put into a 100 ml separable flask equipped with a stirrer and a thermocouple, to which was added 1.3 g of p-benzoquinone and heated at 110° C. Next, a liquid mixture comprised of a solution of permaleic anhydride (this was prepared from 11.8 g of maleic anhydride and 6.8 g of aqueous 60 wt. % hydrogen peroxide) and 8.6 g of acrylic acid, and an aqueous solution as prepared by adding 2.6 g of 2-mercaptoethyl alcohol to 19.2 g of an aqueous solution of 50 wt. % sodium hydroxide were added thereto at the same time over a period of 50 minutes, with stirring them. After the addition, this was further stirred at 110° C., and reacted for one hour.

After the reaction, the resulting product was lyophilized to obtain 34.4 g (yield: 92%) of a solid polymer.

The polymer was subjected to gel permeation chromatography (GPC) with polyacrylic acid serving as the standard substance, and its number-average molecular weight was 3,150. Its weight-average molecular weight was 18,000.

The data of the calcium-sequestering ability and the biodegradability of the polymer are given in Table 3.

EXAMPLE 8

An unsaturated carboxylic acid polymer was produced in the same manner as in Example 7. In this, however, the amount of p-benzoquinone used was 2.6 g. The yield of the polymer was 35.2 g (91%).

The number-average molecular weight of the polymer was 2,700, and the weight-average molecular weight thereof was 18,000.

The data of the calcium-sequestering ability and the biodegradability of the polymer are given in Table 3.

EXAMPLE 9

An unsaturated carboxylic acid polymer was produced in the same manner as in Example 7. In this, however, 10.2 g of aqueous 60 wt. % hydrogen peroxide was used in preparing the solution of permaleic acid. The yield of the polymer was 32.9 g (88%).

The number-average molecular weight of the polymer was 1,310, and the weight-average molecular weight thereof was 7,000.

The data of the calcium-sequestering ability and the biodegradability of the polymer are given in Table 3.

EXAMPLE 10

An unsaturated carboxylic acid polymer was produced in the same manner as in Example 9. In this, however, the amount of p-benzoquinone used was 2.6 g. The yield of the polymer was 35.9 g (93%).

The number-average molecular weight of the polymer was 1,050, and the weight-average molecular weight thereof was 5,500.

The data of the calcium-sequestering ability and the biodegradability of the polymer are given in Table 3.

EXAMPLE 11

9.8 g of maleic anhydride, 0.54 g of p-benzoquinone and 5 g of acetone were put into a 100 ml separable flask equipped with a stirrer and a reflux condenser, and the flask was heated in an oil bath at 110° C. for 20 minutes with stirring the contents.

With further stirring it under heat, a mixed solution of 7.2 g of acrylic acid and 3 g of acetone, and a solution of 0.96 g of a polymerization initiator, azobisisobutyronitrile in 5 g of acetone were dropwise added thereto over a period of 30 minutes. Then, this was further stirred under heat for 2 hours and reacted. As a result, this gave 17.1 g (yield: 95%) of an unsaturated carboxylic acid polymer.

After the reaction, water was added to the product, and this was made to have pH of 9 with an aqueous solution of sodium hydroxide added thereto.

The number-average molecular weight of the polymer produced herein was 2,830, and the weight-average molecular weight thereof was 17,900.

The data of the calcium-sequestering ability and the biodegradability of the polymer are given in Table 3.

EXAMPLE 12

An unsaturated carboxylic acid polymer was produced in the same manner as in Example 11. In this, however, the amount of p-benzoquinone used was 0.27 g. The yield of the polymer was 16.2 g (91%)

The number-average molecular weight of the polymer was 4,150, and the weight-average molecular weight thereof was 18,700.

The data of the calcium-sequestering ability and the biodegradability of the polymer are given in Table 3.

EXAMPLE 13

9.8 g of maleic anhydride, 0.27 g of p-benzoquinone and 5 g of acetone were put into a 100 ml separable flask equipped with a stirrer and a reflux condenser, and the flask was heated in an oil bath at 110° C. for 20 minutes with stirring the contents.

With further stirring it under heat, a solution of 7.2 g of acrylic acid and 1.95 g of a chain transfer agent, 2-mercaptoethyl alcohol in 3 g of acetone, and a solution 0.96 g of a polymerization initiator, azobisisobutyronitrile in 5 g of acetone were dropwise added thereto over a period of 30 minutes. Then, this was further stirred under heat for 2 hours and reacted. As a result, this gave 18.3 g (yield: 93%) of an unsaturated carboxylic acid polymer.

After the reaction, water was added to the product, and this was made to have pH of 9 with an aqueous solution of sodium hydroxide added thereto.

The number-average molecular weight of the polymer produced herein was 6,750, and the weight-average molecular weight thereof was 22,100.

The data of the calcium-sequestering ability and the biodegradability of the polymer are given in Table 3.

EXAMPLE 14

29.4 g of maleic anhydride and 30 ml of water were put into a 300 ml separable flask equipped with a stirrer, a thermocouple and a reflux condenser. With cooling it, 20 ml of an aqueous solution of 24.0 g of sodium hydroxide was gently added thereto.

Next, 21.6 g of acrylic acid, 1.62 g of p-benzoquinone, and 90 mg of ferrous chloride tetrahydrate (this is a reducing agent to be combined with hydrogen peroxide) were fed into the flask, which was then heated in an oil bath at 60° C. with stirring the contents. Next, 17.0 g of an aqueous 60 wt. % hydrogen peroxide was dropwise added thereto over a period of 1 hour, and these were reacted at 60° C. for 3 hours with stirring them.

After the reaction, the product was lyophilized into a solid. The yield of the polymer thus produced was 61.4 g (88%).

The number-average molecular weight of the polymer was 2,240, and the weight-average molecular weight thereof was 16,500.

The data of the calcium-sequestering ability and the biodegradability of the polymer are given in Table 3.

EXAMPLE 15

An unsaturated carboxylic acid polymer was produced in the same manner as in Example 14. In this, however, the amount of ferrous chloride tetrahydrate added was 30 mg. The yield of the polymer was 63.4 g (91%).

The number-average molecular weight of the polymer was 3,910, and the weight-average molecular weight thereof was 37,400.

The data of the calcium-sequestering ability and the biodegradability of the polymer are given in Table 3.

EXAMPLE 16

An unsaturated carboxylic acid polymer was produced in the same manner as in Example 14. In this, however, 270 mg of ascorbic acid was used in place of ferrous chloride tetrahydrate. The yield of the polymer was 60.0 g (86%).

The number-average molecular weight of the polymer was 2,710, and the weight-average molecular weight thereof was 18,200.

The data of the calcium-sequestering ability and the biodegradability of the polymer are given in Table 3.

EXAMPLE 17

17.64 g of maleic anhydride and 30 ml of water were put into a 300 ml separable flask equipped with a stirrer, a thermocouple and a reflux condenser. With cooling it, 20 ml of an aqueous solution of 21.6 g of sodium hydroxide was gently added thereto.

Next, 21.6 g of acrylic acid, 6.72 g of acrolein, 1.62 g of p-benzoquinone, and 10 mg of ferrous chloride tetrahydrate (this is a reducing agent to be combined with hydrogen peroxide) were fed into the flask, which was then heated in an oil bath at 60° C. with stirring the contents. Next, 17.0 g of an aqueous 60 wt. % hydrogen peroxide was dropwise added thereto over a period of 1 hour, and these were reacted at 60° C. for 3 hours with stirring them.

After the reaction, the product was lyophilized into a solid. The yield of the polymer thus produced was 55.5 g (93%).

The number-average molecular weight of the polymer was 2,000, and the weight-average molecular weight thereof was 61,000.

The data of the calcium-sequestering ability and the biodegradability of the polymer are given in Table 3.

EXAMPLE 18

17.64 g of maleic anhydride, 1.62 g of p-benzoquinone and 10 g of acetone were put into a 300 ml separable flask equipped with a stirrer, a thermocouple and a reflux condenser, and the flask was heated in an oil bath at 110° C. with stirring the contents. Next, a mixed solution of 21.6 g of acrylic acid, 6.72 g of acrolein and 10 g of acetone, and a solution 1.5 g of azobisisobutyronitrile in 10 g of acetone were dropwise added thereto at the same time over a period of 0.5 hours. Then, this was further stirred under heat for 2 hours and reacted.

After the reaction, the product was neutralized with sodium hydroxide, and then lyophilized into a solid. The yield of the polymer thus produced was 49.0 g (82%).

The number-average molecular weight of the polymer was 4,730, and the weight-average molecular weight thereof was 53,600.

The data of the calcium-sequestering ability and the biodegradability of the polymer are given in Table 3.

Comparative Example 4

1.96 g of maleic anhydride, 0.8 g of sodium hydroxide and 2 g of water were put into a 100 ml separable flask equipped with a stirrer and a thermocouple, and this was heated at 100° C.

Next, a solution of 13.7 g of maleic anhydride, 6.35 g of aqueous 60 wt. % hydrogen peroxide and 11.52 g of acrylic acid, and a solution of 12 g of sodium hydroxide and 12 g of water were dropwise added thereto at the same time over a period of 30 minutes, with further stirring them.

After the addition, the resulting product was lyophilized to give 37.5 g (yield: 94%) of a maleic acid/acrylic acid copolymer.

The number-average molecular weight of the copolymer produced herein was 8,360, and the weight-average molecular weight thereof was 49,100.

The data of the calcium-sequestering ability and the biodegradability of the polymer are given in Table 3.

EXAMPLE 19

The polymer obtained in Example 7 was formed into an aqueous solution, which was then made to have pH of 10 with sodium hydroxide added thereto. This was used as a builder.

A detergent composition was prepared from 20 parts by weight of the builder, 25 parts by weight of sodium linear alkylbenzenesulfonate and 10 parts by weight of sodium alkylsulfate both serving as surfactant, and other additives, 10 parts by weight of sodium silicate, 2 parts by weight of polyethylene glycol, 15 parts by weight of sodium carbonate, 5 parts by weight of sodium sulfate and 13 parts by weight of water.

The composition and its detergency evaluated are given in Table 4.

EXAMPLES 20 TO 30

The polymer produced in any of Examples 8 to 18 was formed into an aqueous solution, which was then made to have pH of 10 with sodium hydroxide added thereto. This was used as a builder.

The builder was combined with surfactants and other additives to prepare detergent compositions as in Table 4.

The compositions and their detergency evaluated are given in Table 4.

Comparative Examples 4 and 5

(1) Preparation of Detergent Composition

A conventional builder, zeolite type A was combined with surfactants and other additives to prepare two types of detergent compositions as in Table 4.

The compositions and their detergency evaluated are given in Table 4.

EXAMPLES 31 TO 42

The polymer produced in any of Examples 7 to 18 was dissolved in water to have a polymer concentration of 10 ppm, to which was added activated clay to prepare an aqueous dispersion having a clay concentration of 1% by weight. The resulting dispersions were tested for their dispersibility, and the data obtained are given in Table 5.

The absorbance of the samples containing the polymer dispersant only was 0.100; and that in the blank test was 0.000.

EXAMPLE 43

5.88 g of maleic anhydride was put into a 100 ml separable flask equipped with a stirrer and a thermocouple, to which was added a solution of 4.8 g of sodium hydroxide in 9 g of water. To this were added 4.3 g of acrylic acid, 0.32 g of hydroquinone and 30 mg of ferrous chloride tetrahydrate, and heated at 60° C. Next, 3.4 g of aqueous 60 wt. % hydrogen peroxide was dropwise added thereto over a period of 15 minutes. After the addition, this was stirred at 60° C. for 3 hours, and reacted.

After the reaction, the product was lyophilized to obtain a polymer. The yield of the polymer was 13.8 g (98%).

The polymer thus obtained was purified through re-precipitation, and analyzed through $^1$H-NMR. Its chart gave a quinone skeleton-derived peak at 6.7 to 7.0 ppm, and this indicates the presence of a quinone structure in the polymer chain. In addition, the purified polymer was analyzed through $^{13}$C-NMR, and its chart gave carbon atom absorption peaks derived from the bonding of a benzene ring and an acrylic or maleic acid residue-based structural unit. From the data, the chemical structure of the polymer obtained herein was identified as follows:

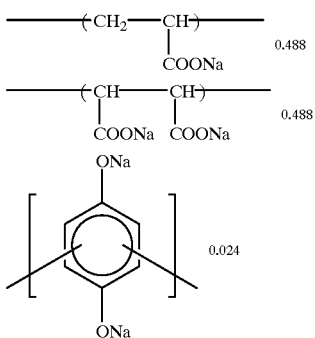

The properties of the polymer are given in Table 6.

EXAMPLE 44

A polymer was produced in the same manner as in Example 43, except that 30 mg of ferric chloride hexahydrate but not ferrous chloride tetrahydrate was used herein. The yield of the polymer was 13.5 g (96%).

The chemical structure of the polymer obtained herein was the same as that of the polymer obtained in Example 43. The properties of the polymer are given in Table 6.

EXAMPLE 45

A polymer was produced in the same manner as in Example 43, except that 20 mg of ferrous sulfate heptahydrate but not ferrous chloride tetrahydrate was used herein. The yield of the polymer was 13.3 g (94%).

The chemical structure of the polymer obtained herein was the same as that of the polymer obtained in Example 43. The properties of the polymer are given in Table 6.

EXAMPLE 46

A polymer was produced in the same manner as in Example 43, except that 0.31 g of p-benzoquinone but not hydroquinone was used herein. The yield of the polymer was 13.1 g (93%).

The chemical structure of the polymer obtained herein was the same as that of the polymer obtained in Example 43. The properties of the polymer are given in Table 6.

EXAMPLE 47

5.88 g of maleic anhydride was put into a 100 ml separable flask equipped with a stirrer and a thermocouple, to which was added a solution of 4.8 g of sodium hydroxide in 9 g of water. To this were added 4.3 g of acrylic acid and 0.31 g of p-benzoquinone in that order, and then heated at 100° C. Next, a solution of 0.98 g of 2,2-azobis(2-amidinopropane) dihydrochloride in 5 g of water was dropwise added thereto over a period of 15 minutes. After the addition, this was stirred at 100° C. for 3 hours, and reacted.

After the reaction, the product was lyophilized to obtain a polymer. The yield of the polymer was 14.6 g (97%) The chemical structure of the polymer obtained herein was the same as that of the polymer obtained in Example 43. The properties of the polymer are given in Table 6.

Comparative Example 6

1.96 g of maleic anhydride was put into a 100 ml separable flask equipped with a stirrer and a thermocouple, to which was added a solution of 0.8 g of sodium hydroxide in 2 g of water, and then heated at 100° C. Next, a solution of 13.7 g of maleic anhydride, 6.35 g of aqueous 60 wt. % hydrogen peroxide and 11.52 g of acrylic acid, and a solution of 12 g of sodium hydroxide in 12 g of water were dropwise added thereto at the same time over a period of 30 minutes, with stirring them.

After the reaction, the product was lyophilized to obtain a polymer. The properties of the polymer are given in Table 6.

EXAMPLES 48 TO 52

The polymer produced in any of Examples 43 to 47 was made to have pH of 10 with an aqueous solution of sodium hydroxide added thereto, and then lyophilized. Using the resulting polymer as a builder, prepared were detergent compositions as in Table 7. The compositions were tested for their detergency, and the data obtained are given in Table 7.

Comparative Example 7

Using the polymer produced in Comparative Example 6, a detergent composition was prepared in the same manner as in Examples 48 to 52. This was tested for its detergency, and the data obtained are given in Table 7.

EXAMPLES 53 TO 57

The polymer produced in any of Examples 43 to 47 was dissolved in water to have a polymer concentration of 10 ppm, to which was added activated clay to prepare an aqueous dispersion having a clay concentration of 1% by weight. The resulting dispersions were tested for their dispersibility, and the data obtained are given in Table 8.

Comparative Example 8

A dispersion of the same activated clay as in Examples 53 to 57 was prepared. To this, however, added was no polymer serving as a dispersant. The dispersion was tested for its dispersibility, and the data obtained are given in Table 8.

Reference Example 1

(1) Production of Unsaturated Carboxylic Acid Copolymer

In a 500 ml separable flask equipped with a stirrer and a thermocouple, 98 g of maleic anhydride, 88 g of sodium hydroxide and 100 g of water were reacted to prepare a maleic acid sodium salt. To this were added 86.4 g of acrylic acid and 5.4 g of p-benzoquinone, and heated at 110° C.

Next, with the solution in the flask being stirred, 56.6 g of aqueous 60 wt. % hydrogen peroxide was dropwise added thereto over a period of 20 minutes. After the addition, this was further stirred at 110° C. for 3 hours, and reacted.

After the reaction, the product was lyophilized to obtain 349.8 g (yield: 98%) of a solid, unsaturated carboxylic acid copolymer.

The number-average molecular weight of the unsaturated carboxylic acid copolymer was measured through gel permeation chromatography (GPC), for which was used polyacrylic acid as the standard substance, and it was 6,500.

From its $^{13}$C-NMR and $^1$H-NMR data, the copolymer was identified as an unsaturated carboxylic acid copolymer comprising the following repetitive units:

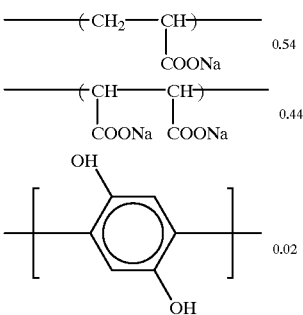

(2) Evaluation of Calcium Ion-Sequestering Ability of the Copolymer 20 mg of the unsaturated carboxylic acid copolymer obtained in the previous (1) was put into a 200 ml beaker, to which was added 100 g of an aqueous solution containing 0.1 N calcium chloride, 0.1 N potassium chloride and 0.4 N ammonia and having a calcium ion concentration of 40 ppm, and the copolymer was dissolved in the aqueous solution.

The divalent calcium ion concentration in the resulting solution was measured, using a calcium ion electrode. The amount of calcium ions as sequestered by 1 g of the copolymer was obtained in terms of calcium carbonate (unit: mg), which indicates the calcium ion-sequestering ability of the copolymer. The calcium ion-sequestering ability of the unsaturated carboxylic acid copolymer obtained in (1) was 252 mg/g.

Reference Example 2

(1) Production of Unsaturated Carboxylic Acid Copolymer

In a 1000 ml separable flask equipped with a stirrer and a thermocouple, 98 g of maleic anhydride, 80 g of sodium hydroxide and 150 g of water were reacted to prepare a maleic acid sodium salt. To this were added 72.0 g of acrylic acid, 5.5 g of hydroquinone and 20 mg of ferric chloride tetrahydrate, and heated at 80° C.

Next, with the solution in the flaskbeing stirred, 56.6 g of aqueous 60 wt. % hydrogen peroxide was dropwise added thereto over a period of 15 minutes. After the addition, this was further stirred at 80° C. for 3 hours, and reacted. After the reaction, the product was lyophilized to obtain 245 g (yield: 96%) of a solid, unsaturated carboxylic acid copolymer.

The number-average molecular weight of the copolymer was measured through GPC, and it was 11,200.

From its $^{13}$C-NMR and $^1$H-NMR data, the copolymer was identified as an unsaturated carboxylic acid copolymer comprising the following repetitive units:

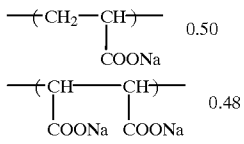

-continued

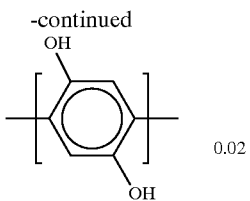

(2) Evaluation of Calcium Ion-Sequestering Ability of the Copolymer

In the same manner as in Reference Example 1 (2), the calcium ion-sequestering ability of the unsaturated carboxylic acid copolymer obtained in the previous (1) was measured, and it was 240 mg/g.

EXAMPLE 58

(1) Preparation of Detergent Composition

The unsaturated carboxylic acid copolymer that had been produced in Reference Example 1 (1) was formed into an aqueous solution, which was then made to have pH of 9 with sodium hydroxide added thereto. This was used as a builder.

A detergent composition was prepared from 2 parts by weight of the builder, 50 parts by weight of polyoxyethylene alkyl ether serving as a surfactant, 2 parts by weight of ethanol serving as a solubility enhancer, 5 parts by weight of ethanolamine serving as an alkaline agent and 41 parts by weight of water.

(2) Evaluation of the Detergency of the Detergent Composition

The detergent composition obtained in the previous (1) was tested for its detergency. As a result, the detergency of the detergent composition prepared in (1) was 60%.

The detergent composition and its detergency evaluated are given in Table 9.

EXAMPLE 59

(1) Preparation of Detergent Composition

A detergent composition was prepared in the same manner as in Example 58 (1). In this, however, the blend ratio of the unsaturated carboxylic acid copolymer obtained in Reference Example 1 (1) was 5% by weight, and that of water was 38% by weight.

(2) Evaluation of the Detergency of the Detergent Composition

The detergent composition prepared in the previous (1) was tested for its detergency.

The detergent composition and its detergency evaluated are given in Table 9.

EXAMPLE 60

(1) Preparation of Detergent Composition

A detergent composition was prepared in the same manner as in Example 58 (1). In this, however, the unsaturated carboxylic acid copolymer obtained in Reference Example 2 (1) was used as the builder.

(2) Evaluation of the Detergency of the Detergent Composition

The detergent composition prepared in the previous (1) was tested for its detergency.

The detergent composition and its detergency evaluated are given in Table 9.

EXAMPLE 61

(1) Preparation of Detergent Composition

A detergent composition was prepared in the same manner as in Example 58 (1). In this, however, the blend ratio of the unsaturated carboxylic acid copolymer obtained in Reference Example 2 (1) was 5% by weight, and that of water was 38% by weight.

(2) Evaluation of the Detergency of the Detergent Composition

The detergent composition prepared in the previous (1) was tested for its detergency.

The detergent composition and its detergency evaluated are given in Table 9.

Comparative Example 9

(1) Preparation of Detergent Composition

A detergent composition was prepared in the same manner as in Example 58 (1). In this, however, no builder was used, and the blend ratio of water was 43% by weight.

(2) Evaluation of the Detergency of the Detergent Composition

The detergent composition prepared in the previous (1) was tested for its detergency.

The detergent composition and its detergency evaluated are given in Table 9.

EXAMPLE 62

5.88 g of maleic anhydride was put into a 100 ml separable flask equipped with a stirrer and a thermocouple, to which was added an aqueous solution of 4.8 g of sodium hydroxide in 7 g of water. Then, 4.3 g of acrylic acid, 0.64 g of hydroquinone and 15 mg of $FeCl_2$ were added thereto in that order, and heated at 80° C. Next, aqueous 60% hydrogen peroxide was dropwise added thereto over a period of 60 minutes, with stirring them. After the addition, this was further stirred under heat at the same temperature for 3 hours. After the reaction, the product was lyophilized to obtain a solid. The properties of the resulting polymer are given in Table 10 and Table 11; and a detergent composition comprising the polymer and its properties are in Table 12.

Comparative Example 10

The same process as in Example 62 was repeated, except that hydroquinone was not used herein. The properties of the polymer obtained are given in Table 10 and Table 11.

EXAMPLE 63

The same process as in Example 62 was repeated, except that 5 mg of $FeCl_2$ was used herein. The properties of the polymer obtained are given in Table 10 and Table 11; and a detergent composition comprising the polymer and its properties are in Table 12.

EXAMPLE 64

The same process as in Example 62 was repeated. In this, however, hydrogen peroxide was added to the system over a period of 120 minutes, the total reaction time was 3 hours, and the amount of $FeCl_2$ used was 1 mg. The properties of the polymer obtained herein are given in Table 10 and Table 11; and a detergent composition comprising the polymer and its properties are in Table 12.

EXAMPLE 65

The same process as in Example 62 was repeated. In this, however, hydrogen peroxide was added to the system over a period of 120 minutes, the total reaction time was 3 hours, and the amount of $FeCl_2$ used was 0.5 mg. The properties of the polymer obtained herein are given in Table 10 and Table 11; and a detergent composition comprising the polymer and its properties are in Table 12.

EXAMPLE 66

The same process as in Example 63 was repeated. In this, however, hydrogen peroxide was added to the system over a period of 120 minutes, and the total reaction time was 3 hours. The properties of the polymer obtained herein are given in Table 10 and Table 11; and a detergent composition comprising the polymer and its properties are in Table 12.

EXAMPLE 67

138 g of monosodium salt of maleic acid, 15 mg of ferrous chloride tetrahydrate, 11.0 g of hydroquinone and 60 g of water were put into a 1000 ml separable flask equipped with a reflux condenser, and heated in an oil bath at 100° C. Next, 56.6 g of aqueous 60% hydrogen peroxide, 72.0 g of acrylic acid and a solution of 40 g of sodium hydroxide and 60 g of water were dropwise added thereto at the same time over a period of 2 hours. After the addition, this was further heated and stirred for 1 hour. Then, this was cooled and lyophilized to obtain a solid. The properties of the resulting polymer are given in Table 10 and Table 11; and a detergent composition comprising the polymer and its properties are in Table 12.

EXAMPLE 68

138 g of monosodium salt of maleic acid, 15 mg of ferrous chloride tetrahydrate, 11.0 g of hydroquinone and 60 g of water were put into a 1000 ml separable flask equipped with a reflux condenser, and heated in an oil bath at 100° C. Next, 56.6 g of aqueous 60% hydrogen peroxide, 86.4 g of acrylic acid and a solution of 48 g of sodium hydroxide and 7 g of water were dropwise added thereto at the same time over a period of 2 hours. After the addition, this was further heated and stirred for 1 hour. Then, this was cooled and lyophilized to obtain a solid. The properties of the resulting polymer are given in Table 10 and Table 11; and a detergent composition comprising the polymer and its properties are in Table 12.

Comparative Examples 11 and 12

Detergent compositions were prepared in the same manner as in the previous Examples. In these, however, zeolite type A but not the polymer was used as in Table 12. The properties of the detergent compositions are given in Table 12.

TABLE 1

| | Amount of Quinone Added (mol %) | Yield of Polymer (g) | Yield of Polymer (%) | Number-Average Molecular Weight | Weight-Average Molecular Weight | $Ca^{2+}$—Sequestering Ability (mg/g) | Biodegradability (%) | Dispersibility |
|---|---|---|---|---|---|---|---|---|
| Example 1 | 2.5 | 226 | 89 | 5900 | 26600 | 213 | 65 | 0.122 |
| Example 2 | 2.5 | 257 | 94 | 4100 | 10800 | 180 | 86 | 0.095 |
| Example 3 | 2.5 | 228 | 90 | 6700 | 34900 | 195 | 70 | 0.101 |
| Example 4 | 2.5 | 239 | 93 | 5800 | 27200 | 220 | 74 | 0.095 |
| Comp. Ex. 1 | — | 37.5 | 94 | 8360 | 49100 | 251 | 5 | 0.113 |

TABLE 2

| | | Example 5 | Example 6 | Comp. Ex. 2 | Comp. Ex. 3 |
|---|---|---|---|---|---|
| Ingredients of Detergent Composition (wt. %) | LAS | 25 | 20 | 25 | 20 |
| | AS | 10 | 10 | 10 | 10 |
| | Nonionic Surfactant | — | 5 | — | 5 |
| | Polymer of Example 2 | 20 | — | — | — |
| | Polymer of Example 3 | — | 20 | — | — |
| | Zeolite Type A | — | — | 20 | 20 |
| | Sodium Silicate | 10 | 10 | 10 | 10 |
| | PEG | 2 | 2 | 2 | 2 |
| | Sodium Carbonate | 20 | 15 | 15 | 15 |
| | Sodium Sulfate | — | 5 | 5 | 5 |
| | Water | balance | balance | balance | balance |
| Detergency (%) | | 63 | 66 | 50 | 52 |

TABLE 3

| Example Comparative Example | Yield (g) | Yield (%) | Number-Average Molecular Weight | Weight-Average Molecular Weight | $Ca^{2+}$—Sequestering Ability (mg/g) | Biodegradability (%) |
|---|---|---|---|---|---|---|
| Example 7 | 34.4 | 92 | 3150 | 18000 | 220 | 85 |
| Example 8 | 35.2 | 90 | 2700 | 16500 | 200 | 90 |
| Example 9 | 32.9 | 88 | 1310 | 7000 | 215 | 88 |
| Example 10 | 35.9 | 93 | 1050 | 5500 | 205 | 92 |
| Example 11 | 17.1 | 95 | 2830 | 17900 | 160 | 90 |
| Example 12 | 16.2 | 91 | 4150 | 16700 | 200 | 76 |
| Example 13 | 18.3 | 98 | 8750 | 22100 | 210 | 68 |
| Example 14 | 61.4 | 88 | 2240 | 16500 | 252 | 73 |
| Example 15 | 63.4 | 91 | 3910 | 37400 | 273 | 64 |
| Example 16 | 60.0 | 86 | 2710 | 16200 | 221 | 69 |

TABLE 3-continued

| Example Comparative Example | Yield (g) | Yield (%) | Number-Average Molecular Weight | Weight-Average Molecular Weight | $Ca^{2+}$—Sequestering Ability (mg/g) | Biodegradability (%) |
|---|---|---|---|---|---|---|
| Example 17 | 55.5 | 93 | 2000 | 61000 | 200 | 87 |
| Example 18 | 49.0 | 82 | 4730 | 53600 | 205 | 69 |
| Comp. Ex. 4 | 37.5 | 94 | 8360 | 49100 | 251 | 5 |

TABLE 4(1)

| Example (Comparative Example) | | 19 | 20 | 21 | 22 | 23 | 24 | 25 | 26 |
|---|---|---|---|---|---|---|---|---|---|
| Ingredients of Detergent Composition (wt. %) | Builder | 20 | 20 | 20 | 20 | 20 | 20 | 20 | 20 |
| | LAS | 25 | 20 | 25 | 20 | 25 | 20 | 25 | 20 |
| | AS | 10 | 5 | 10 | 5 | 10 | 5 | 10 | 5 |
| | Nonionic Surfactant | — | — | — | — | — | — | — | — |
| | Zeolite Type A | — | — | — | — | — | — | — | — |
| | Sodium Silicate | 10 | 10 | 10 | 10 | 10 | 10 | 10 | 10 |
| | PEG | 2 | 2 | 2 | 2 | 2 | 2 | 2 | 2 |
| | Sodium Carbonate | 15 | 15 | 15 | 15 | 15 | 15 | 15 | 15 |
| | Sodium Sulfate | 5 | 5 | 5 | 5 | 5 | 5 | 5 | 5 |
| | Water | balance | balance | balance | balance | balance | balance | balance | balance |
| Detergency (%) | | 66 | 64 | 66 | 65 | 66 | 66 | 65 | 66 |

TABLE 4(2)

| Example (Comparative Example) | | 27 | 28 | 29 | 30 | (4) | (5) |
|---|---|---|---|---|---|---|---|
| Ingredients of Detergent Composition (wt. %) | Builder | 20 | 20 | 20 | 20 | — | — |
| | LAS | 25 | 20 | 25 | 20 | 25 | 20 |
| | AS | 10 | 5 | 10 | 5 | 10 | 10 |
| | Nonionic Surfactant | — | — | — | — | — | 5 |
| | Zeolite Type A | — | — | — | — | 20 | 20 |
| | Sodium Silicate | 10 | 10 | 10 | 10 | 10 | 10 |
| | PEG | 2 | 2 | 2 | 2 | 2 | 2 |
| | Sodium Carbonate | 15 | 15 | 15 | 15 | 15 | 15 |
| | Sodium Sulfate | 5 | 5 | 5 | 5 | 5 | 5 |
| | Water | balance | balance | balance | balance | balance | balance |
| Detergency (%) | | 64 | 65 | 66 | 65 | 50 | 52 |

TABLE 5

| Example | Polymer Used | Absorbance |
|---|---|---|
| Example 31 | Polymer of Example 7 | 0.130 |
| Example 32 | Polymer of Example 8 | 0.125 |
| Example 33 | Polymer of Example 9 | 0.135 |
| Example 34 | Polymer of Example 10 | 0.110 |
| Example 35 | Polymer of Example 11 | 0.123 |
| Example 36 | Polymer of Example 12 | 0.140 |

TABLE 5-continued

| Example | Polymer Used | Absorbance |
|---|---|---|
| Example 37 | Polymer of Example 13 | 0.133 |
| Example 38 | Polymer of Example 14 | 0.121 |
| Example 39 | Polymer of Example 15 | 0.115 |
| Example 40 | Polymer of Example 16 | 0.099 |
| Example 41 | Polymer of Example 17 | 0.105 |
| Example 42 | Polymer of Example 18 | 0.118 |

TABLE 6

| Example Comparative Example | Yield (g) | Yield (%) | Number-Average Molecular Weight | Weight-Average Molecular Weight | $Ca^{2+}$—Sequestering Ability (mg/g) | Biodegradability (%) |
|---|---|---|---|---|---|---|
| Example 43 | 13.8 | 98 | 2300 | 24600 | 238 | 83 |
| Example 44 | 13.5 | 96 | 1920 | 14400 | 224 | 78 |
| Example 45 | 13.3 | 94 | 1900 | 10400 | 230 | 80 |
| Example 46 | 13.1 | 93 | 2100 | 22600 | 220 | 75 |

TABLE 6-continued

| Example Comparative Example | Yield (g) | Yield (%) | Number-Average Molecular Weight | Weight-Average Molecular Weight | $Ca^{2+}$—Sequestering Ability (mg/g) | Biodegradability (%) |
|---|---|---|---|---|---|---|
| Example 47 | 14.6 | 97 | 4900 | 188000 | 250 | 70 |
| Comp. Ex. 6 | 37.5 | 94 | 8360 | 49100 | 251 | 5 |

TABLE 7

| Example (Comparative Example) | | 48 | 49 | 50 | 51 | 52 | (7) |
|---|---|---|---|---|---|---|---|
| Ingredients of Detergent Composition (wt. %) | Builder | 20 | 20 | 20 | 20 | 20 | — |
| | LAS | 25 | 20 | 25 | 20 | 25 | 20 |
| | AS | 10 | 5 | 10 | 5 | 10 | 5 |
| | Nonionic Surfactant | — | — | — | — | — | 5 |
| | Zeolite Type A | — | — | — | — | — | 20 |
| | Sodium Silicate | 10 | 10 | 10 | 10 | 10 | 10 |
| | PEG | 2 | 2 | 2 | 2 | 2 | 2 |
| | Sodium Carbonate | 15 | 15 | 15 | 15 | 15 | 15 |
| | Sodium Sulfate | 5 | 5 | 5 | 5 | 5 | 5 |
| | Water | balance | balance | balance | balance | balance | balance |
| Detergency (%) | | 66 | 64 | 65 | 66 | 65 | 52 |

TABLE 8

| Example | Polymer Used | Absorbance |
|---|---|---|
| Example 53 | Polymer of Example 43 | 0.141 |
| Example 54 | Polymer of Example 44 | 0.137 |
| Example 55 | Polymer of Example 45 | 0.135 |
| Example 56 | Polymer of Example 46 | 0.130 |
| Example 57 | Polymer of Example 47 | 0.139 |
| Comparative Example 8 | Polymer of Comparative Example 6 | 0.005 |

TABLE 9

| Example (Comparative Example) | | 58 | 59 | 60 | 61 | (9) |
|---|---|---|---|---|---|---|
| Ingredients of Detergent Composition (wt. %) | Builder | 2 | 5 | 2 | 5 | — |
| | Polyoxyethylene alkyl ether | 50 | 50 | 50 | 50 | 50 |
| | Ethanol | 2 | 2 | 2 | 2 | 2 |
| | Ethanolamine | 5 | 5 | 5 | 5 | 5 |
| | Water | balance | balance | balance | balance | balance |
| Detergency (%) | | 60 | 62 | 61 | 62 | 52 |

TABLE 10-1

| | Quinone | | Yield g | Yield % | Number-Average Molecular Weight | Weight-Average Molecular Weight |
|---|---|---|---|---|---|---|
| | type | mol % | | | | |
| Example 62 | hydroquinone | 5 | 13.7 | 94 | 2200 | 40000 |
| Example 63 | hydroquinone | 5 | 14.1 | 97 | 2600 | 27000 |
| Example 64 | hydroquinone | 5 | 13.8 | 95 | 2600 | 23300 |
| Example 65 | hydroquinone | 5 | 14.3 | 98 | 3500 | 34000 |
| Example 66 | hydroquinone | 5 | 14.0 | 96 | 2500 | 47000 |
| Example 67 | hydroquinone | 5 | 223.5 | 92 | 2400 | 11000 |
| Example 68 | hydroquinone | 5 | 235.6 | 90 | 2600 | 14000 |
| Comp. Ex. 10 | | | 35.9 | 94 | 8360 | 49100 |

TABLE 10-2

| | Ca-Sequestering Ability mg/g | Biodegradability % |
|---|---|---|
| Example 62 | 273 | 83 |
| Example 63 | 260 | 87 |
| Example 64 | 296 | 82 |
| Example 65 | 291 | 86 |
| Example 66 | 270 | 83 |
| Example 67 | 320 | 81 |
| Example 68 | 330 | 80 |
| Comp. Ex. 10 | 251 | 5 |

TABLE 11

| | Absorbance |
|---|---|
| Polymer of Example 62 | 0.140 |
| Polymer of Example 63 | 0.139 |
| Polymer of Example 64 | 0.142 |
| Polymer of Example 65 | 0.143 |
| Polymer of Example 66 | 0.138 |
| Polymer of Example 67 | 0.139 |
| Polymer of Example 68 | 0.140 |
| Blank | 0.000 |

TABLE 12

| | | Example | | | | | | | Comparative Example | |
|---|---|---|---|---|---|---|---|---|---|---|
| | | 62 | 63 | 64 | 65 | 66 | 67 | 68 | 11 | 12 |
| Ingredients of Detergent Composition (wt. %) | LAS | 25 | 20 | 25 | 20 | 25 | 20 | 25 | 25 | 20 |
| | AS | 10 | 10 | 10 | 10 | 10 | 10 | 10 | 10 | 10 |
| | Nonionic Surfactant | — | 5 | — | 5 | — | 5 | — | — | 5 |
| | Polymer of Example 62 | 20 | — | — | — | — | — | — | — | — |
| | Polymer of Example 63 | — | 20 | — | — | — | — | — | — | — |
| | Polymer of Example 64 | — | — | 20 | — | — | — | — | — | — |
| | Polymer of Example 65 | — | — | — | 20 | — | — | — | — | — |
| | Polymer of Example 66 | — | — | — | — | 20 | — | — | — | — |
| | Polymer of Example 67 | — | — | — | — | — | 20 | — | — | — |
| | Polymer of Example 68 | — | — | — | — | — | — | 20 | — | — |
| | Zeolite Type A | — | — | — | — | — | — | — | 20 | 20 |
| | Sodium Silicate | 10 | 10 | 10 | 10 | 10 | 10 | 10 | 10 | 10 |
| | PEG | 2 | 2 | 2 | 2 | 2 | 2 | 2 | 2 | 2 |
| | Sodium Carbonate | 20 | 15 | 20 | 15 | 20 | 15 | 20 | 20 | 15 |
| | Sodium Sulfate | — | 5 | — | 5 | — | 5 | — | — | 5 |
| | Water | balance | balance | balance | balance | balance | balance | balance | balance | balance |
| Detergency (%) | | 64 | 63 | 65 | 66 | 63 | 64 | 62 | 50 | 52 |

LSA: sodium linear alkylbenzenesulfonate
AS: sodium alkylsulfate
PEG: polyethylene glycol

INDUSTRIAL APPLICABILITY

The unsaturated carboxylic acid polymer of the invention has good calcium ion-sequestering ability and good biodegradability, and is highly useful as a builder for detergents. Detergent compositions comprising the unsaturated carboxylic acid polymer and a surfactant have high detergency and good biodegradability. In addition, dispersants comprising the unsaturated carboxylic acid polymer have high dispersing power and good biodegradability.

What is claimed is:

1. An unsaturated carboxylic acid polymer having a number-average molecular weight of from 500 to 1,000,000, which is prepared by copolymerizing an unsaturated carboxylic acid or its salt of a general formula [I]:

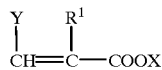

[I]

wherein X represents a hydrogen atom, an alkali metal atom, or an ammonium group; Y represents a hydrogen atom or a group COOX; $R^1$ represents a hydrogen atom or a methyl group, with a quinone in the presence of a polymerization initiator.

2. A biodegradable builder containing, as the constituent ingredient, the unsaturated carboxylic acid polymer of claim 1.

3. A detergent composition containing, as the constituent ingredients, the unsaturated carboxylic acid polymer of claim 1 and a surfactant.

4. A dispersant comprising a polymer prepared by neutralizing the unsaturated carboxylic acid polymer of claim 1 with an alkali.

5. An unsaturated carboxylic acid polymer having repetitive units (1) of a general formula [II]:

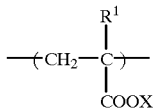

[II]

wherein X represents a hydrogen atom, an alkali metal atom, or an ammonium group; $R^1$ represents a hydrogen atom or a methyl group, repetitive units (2) of a general formula [III]:

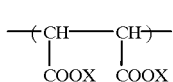

[III]

wherein X represents a hydrogen atom, an alkali metal atom, or an ammonium group, and repetitive units (3) of a general formula [IV]:

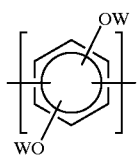

[IV]

wherein W represents a hydrogen atom, an alkali metal atom, or an ammonium group, and having a number-average molecular weight of from 500 to 1,000,000.

6. The unsaturated carboxylic acid polymer as claimed in claim 5, which comprises from 30 to 99.5 mol % of the repetitive units (1), from 0 to 60 mol % of the repetitive units (2), and from 0.5 to 20 mol % of the repetitive units (3).

7. A biodegradable builder containing, as the constituent ingredient, the unsaturated carboxylic acid polymer of claim 6.

8. A detergent composition containing, as the constituent ingredients, the unsaturated carboxylic acid polymer of claim 6 and a surfactant.

9. A dispersant comprising a polymer prepared by neutralizing the unsaturated carboxylic acid polymer of claim 6 with an alkali.

10. A biodegradable builder containing, as the constituent ingredient, the unsaturated carboxylic acid polymer of claim 5.

11. A detergent composition containing, as the constituent ingredients, the unsaturated carboxylic acid polymer of claim 5 and a surfactant.

12. A dispersant comprising a polymer prepared by neutralizing the unsaturated carboxylic acid polymer of claim 5 with an alkali.

13. A method for producing an unsaturated carboxylic acid polymer, which comprises copolymerizing an unsaturated carboxylic acid or its salt of formula [I] with a quinone in the presence of a polymerization initiator.

14. The method for producing an unsaturated carboxylic acid polymer as claimed in claim 13, which the quinone is hydroquinone or benzoquinone.

15. The method for producing an unsaturated carboxylic acid polymer as claimed in claim 13, in which the polymerization initiator is a combination of (a) hydrogen peroxide and (b) at least one reducing agent selected from iron ions, copper ions, zinc ions, nickel ions, ascorbic acid and saccharin.

16. The method for producing an unsaturated carboxylic acid polymer as claimed in claim 13, in which the polymerization initiator is an azo-type polymerization initiator.

17. The method for producing an unsaturated carboxylic acid polymer as claimed in claim 13, in which a compound of a general formula [V]:

$$Z—(CH_2)_p—SH \qquad [V]$$

wherein Z represents a hydroxyl group or an amino group;
p indicates an integer of from 1 to 6,
is further used as a chain transfer agent in a ratio of from 0.1 to 20 mol % of all the starting monomers.

18. A detergent composition containing an unsaturated carboxylic acid copolymer and a surfactant, in which the copolymer has repetitive units (1) of a general formula [VI]

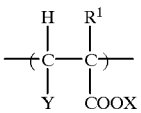

wherein X represents a hydrogen atom, an alkali metal atom, or an ammonium group; Y represents a hydrogen atom or a group COOX; $R^1$ represents a hydrogen atom or a methyl group, and repetitive units (2) of a general formula [IV]:

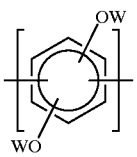

wherein W represents a hydrogen atom, an alkali metal atom, or an ammonium group,
and has a number-average molecular weight of from 500 to 1,000,000.

19. The detergent composition as claimed in claim 18, in which the repetitive units (2) account for from 0.5 to 20 mol % of the unsaturated carboxylic acid copolymer.

20. The detergent composition as claimed in claim 18, in which the surfactant is one or more selected from alkylbenzenesulfonate, α-olefinsulfonate, alkyl sulfates, alkyl-polyoxyethylene sulfates, alkyl-polyoxyethylene ether sulfates, and higher alcohol sulfates.

21. The detergent composition as claimed in claim 18, in which the ratio of the unsaturated carboxylic acid copolymer to the surfactant falls between ¼ and ⅟₃₀ by weight.

22. The detergent composition as claimed in claim 18, which further contains an enzyme, a fluorescent brightening agent and an anti-foaming agent.

* * * * *